Figure 1:
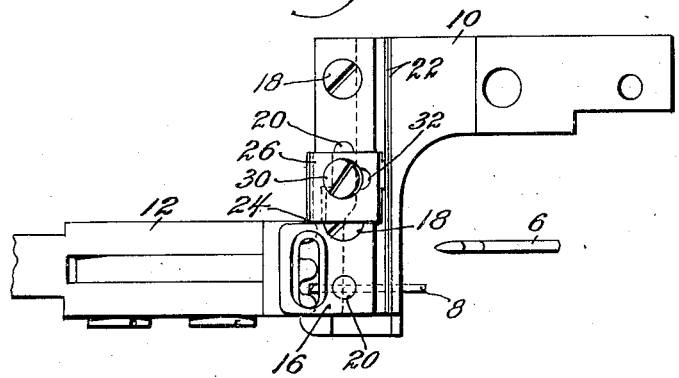

Inventor
Henry J. Koloske
by his Attorney

Patented Nov. 15, 1949

2,487,928

UNITED STATES PATENT OFFICE 2,487,928

MOCCASIN SEWING AND TRIMMING MACHINE

Henry J. Koloske, Milwaukee, Wis., assignor to United Shoe Machinery Corporation, Flemington, N. J., a corporation of New Jersey Application June 4, 1947, Serial No. 752,371

3 Claims. (Cl. 112—62)

1

The present invention relates to machines for sewing together and trimming the edges of the top piece or tongue and the side part or vamp of a moccasin or an imitation moccasin type shoe and is hereinafter described as embodied in a machine similar to that disclosed in U. S. Letters Patent No. 2,366,703, granted January 9, 1944, on application of Fred Ashworth.

In a machine of the type disclosed in U. S. Letters Patent No. 2,284,514, granted May 26, 1942, on application of Joseph A. Cordeau and No. 2,387,813, granted October 30, 1945, on application of Francis R. Speight, the pieces of a moccasin type shoe upper are sewed and simultaneously trimmed by a knife clamped between separate parts of a work support provided for guiding the moccasin pieces externally during sewing. During operation of the machine in the patents it is necessary occasionally to remove the knife for resharpening or readjustment. To do this it is necessary to separate the parts of the work support, causing them to be subject to liability of misalinement when brought together again. Also the trimming knife being clamped between the parts of the work support, when it is necessary to substitute a new knife for the old one, slight variation in size of the knives may cause improper spacing and further misalinement of the work support parts upon reclamping.

An object of the present invention is to facilitate removal and replacement of an edge trimming knife in a moccasin seam sewing machine in which adjustment of the work support is entirely independent of knife removal and clamping operations. A further object is to simplify the construction and improve the operation of a moccasin seam sewing and trimming machine so that the machine may readily be utilized for sewing operations only when no trimming operations are desired.

To these ends the external work support and the internal presser of the present machine, while constructed in the usual way with work engaging surfaces extending in the direction of feed and disposed with relation to each other to form an angle across which a curved hook needle moves, is provided with a trimming knife simply constructed of flat material having a shank bent at right angles to the main portion thereof and releasably clamped to the work support on a surface of the work support extending crosswise to the path of the needle within the angle of the work engaging surfaces of the work support. A knife constructed in this form is not subject to the clamping pressure of the parts of a two-part

2 work support as in the machine of the Cordeau and Speight patents above referred to and, consequently, may be formed of much thinner and inexpensive material with the advantageous result that it is easier to maintain a sharp cutting edge on the knife. To insure maintaining the knife at the proper angle for effective cutting action at all times the work support is provided with a guideway to receive the shank of the knife and suitable clamping means is arranged to secure the shank in any desired position along the guideway.

Figure 2:
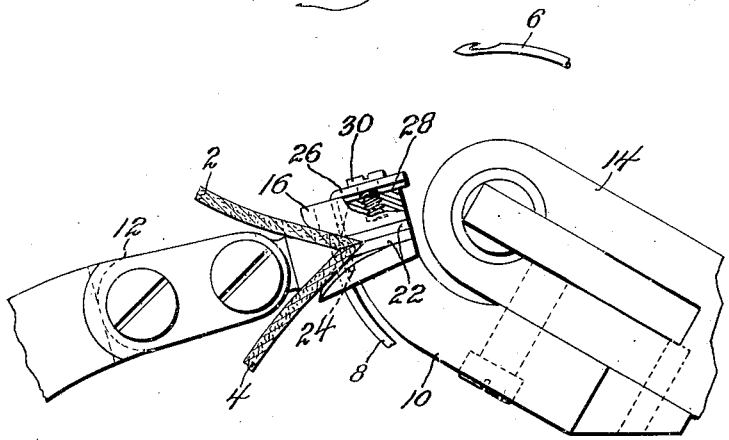
Figure 3:
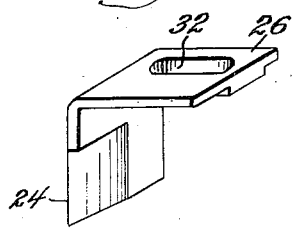

These and other features of the invention are embodied in the devices, combinations and arrangements of parts hereinafter described and claimed, the advantages of which will be readily understood from the following description taken in connection with the accompanying drawing in which Fig. 1 is a plan view of the work support, presser, needle and awl of a moccasin seam sewing and trimming machine embodying the features of the present invention;

Fig. 2 is a view in side elevation of the same portions of the machine including the needle and awl supporting bracket on the frame of the machine; and Fig. 3 is a perspective view on an enlarged scale of the trimming knife shown in Figs. 1 and 2.

The machine illustrated in the drawings is similar to that of the Ashworth, Cordeau and Speight patents above referred to and is adapted to operate on bevel edged moccasin pieces comprising a top piece or plug and a vamp or side part, indicated respectively at 2 and 4. During sewing operations a seam is inserted through the registering bevel faces of the moccasin pieces with the stitches exposed only at the outer surfaces, by lockstitch forming devices, including a curved hook needle 6 and a curved work penetrating and feeding awl 8. The moccasin pieces are compressed and clamped in position during formation of each stitch in the machine by the external action of a work support 10 and an internal presser 12, both of which are provided with complemental work engaging surfaces disposed at an angle to each other and extending in the direction of work feed, the re-entrant angle being provided on the work support.

The work support is constructed in two parts, the main part 10 having a shank which is clamped to a machine frame bracket indicated at 14 and a block part 16 secured to the main part 10 by screws 18 and dowels 20. Each of the parts 10 and 16 of the work support has one of the work engaging surfaces thereon and both parts are spaced from each other by plates 22 selected to hold the work engaging surfaces at the proper distance from each other for the most advantageous sewing operations with the thickness of work being operated upon. When moccasin pieces of different thicknesses are being sewed, substitution of different spacing plates 22 are required. In the machine of the patents where a trimming knife also is disposed between the work support parts 10 and 16 it is necessary to modify the widthwise dimension of the knife to correspond with the size and shape of spacing plates employed so that sewing operations may be accomplished effectively with a particular thickness of work. When work of a substantially different thickness is sewn both the spacing plates and knife must be changed to correspond.

To avoid complicated adjustments and to simplify the removal and replacement of the trimming knife in the machine embodying the present invention, the knife is constructed of inexpensive sheet metal with a main cutting edge portion 24 crossing the angle of the work support and a shank portion 26 bent at right angles to the main portion. To secure the knife to the work support adjustably in proper cutting position the upper surface of the block part 16 has a shallow guideway 28 extending at right angles to the seam line and crosswise to that part of the needle path between the work engaging surfaces of the work support. The position of the guideway in the block part is such that the cutting edge of the knife is located along the line of feed just beyond the point of operation of the stitch forming devices and beyond the work engaging surfaces of the work support to enable the edges of the moccasin pieces to be trimmed after the securing stitches have been inserted. The knife is releasably secured in place by a single clamp screw 30 passing through a slot 32 in the shank of the knife and entering into a threaded opening in the block part 16 of the work support. For removing or replacing the knife it is necessary only to withdraw the clamping screw 30. Adjustment of the knife to enable variation to be made in depth of cut taken in the moccasin piece edges is accomplished merely by sliding the shank of the knife within the guideway in the work support while the clamping screw is loosened.

To enable a narrow guideway to be used, the shank of the knife is milled with a rib to fit the guideway. Where it is desirable to employ a knife of extremely thin material, however, a guideway the full width of the knife is used. In this way relatively simple inexpensive construction is afforded fulfilling all the requirements for trimming a moccasin seam. By clamping the knife to the upper surface of the block piece 16, it is unnecessary to disturb the alinement of the work support parts 10, 16 and the knife may readily be removed for resharpening or other purposes.

The nature and scope of the invention having been indicated and a particular embodiment having been described, what is claimed is:

1. In a machine for sewing and trimming moccasin seams having stitch forming devices including a curved hook needle, an external work support having work engaging surfaces extending in the direction of work feed and disposed with relation to each other to form an angle across which the needle moves, and an internal presser having a tip formed with angularly disposed work engaging surfaces arranged to compress the moccasin pieces operated upon between the work engaging surfaces of the work support, the combination with an edge trimming knife having its cutting edge crossing the angle of the work support and a shank bent at right angles to the main cutting edge portion thereof and releasably secured to guiding surfaces on the work support to enable the depth of cut taken by the knife in the edges of the moccasin pieces to be varied.

2. In a machine for sewing and trimming moccasin seams having stitch forming devices including a curved hook needle, an external work support having work engaging surfaces extending in the direction of work feed and disposed with relation to each other to form an angle across which the needle moves and having other surfaces extending at right angles to the seam line and an internal presser having a tip formed with angularly disposed work engaging surfaces arranged to compress the moccasin pieces operated upon and clamp them within the angle between the work engaging surfaces of the work support, the combination with an edge trimming knife having its cutting edge crossing the angle of the work support and a shank bent at right angles to the main cutting edge portion thereof, and means for releasably securing the shank of the knife in fixed position to said other surfaces on the work support to enable the depth of cut taken by the knife in the edges of the moccasin pieces to be varied by sliding movement of the knife shank on the work support.

3. In a machine for sewing and trimming moccasin seams having stitch forming devices including a curved hook needle, an external work support having work engaging surfaces extending in the direction of work feed and disposed with relation to each other to form an angle across which the needle moves, said work support being formed with a guideway extending crosswise to that portion of the path of the needle which lies within the angle between work engaging surfaces of the work support and an internal presser having a tip formed with angularly disposed work engaging surfaces arranged to compress the moccasin pieces operated upon and clamp them within the angle between the work engaging surfaces of the work support, the combination with an edge trimming knife having a shank bent at right angles to the main portion thereof and fitted within the guideway of the work support, and means for releasably securing the shank of the knife in fixed position within the guideway on the work support to enable the depth of cut taken by the knife in the edges of the moccasin pieces to be varied by sliding movement of the knife shank in the guideway.

HENRY J. KOLOSKE.

REFERENCES CITED

The following references are of record in the file of this patent:

UNITED STATES PATENTS

| Number | Name | Date |
| --- | --- | --- |
| 2,284,514 | Cordeau | May 26, 1942 |
| 2,387,813 | Speight | Oct. 30, 1945 |